Dec. 9, 1930.  G. W. WATTS ET AL  1,784,561
DISTILLATION OF HYDROCARBON OILS
Filed April 3, 1925  2 Sheets-Sheet 1
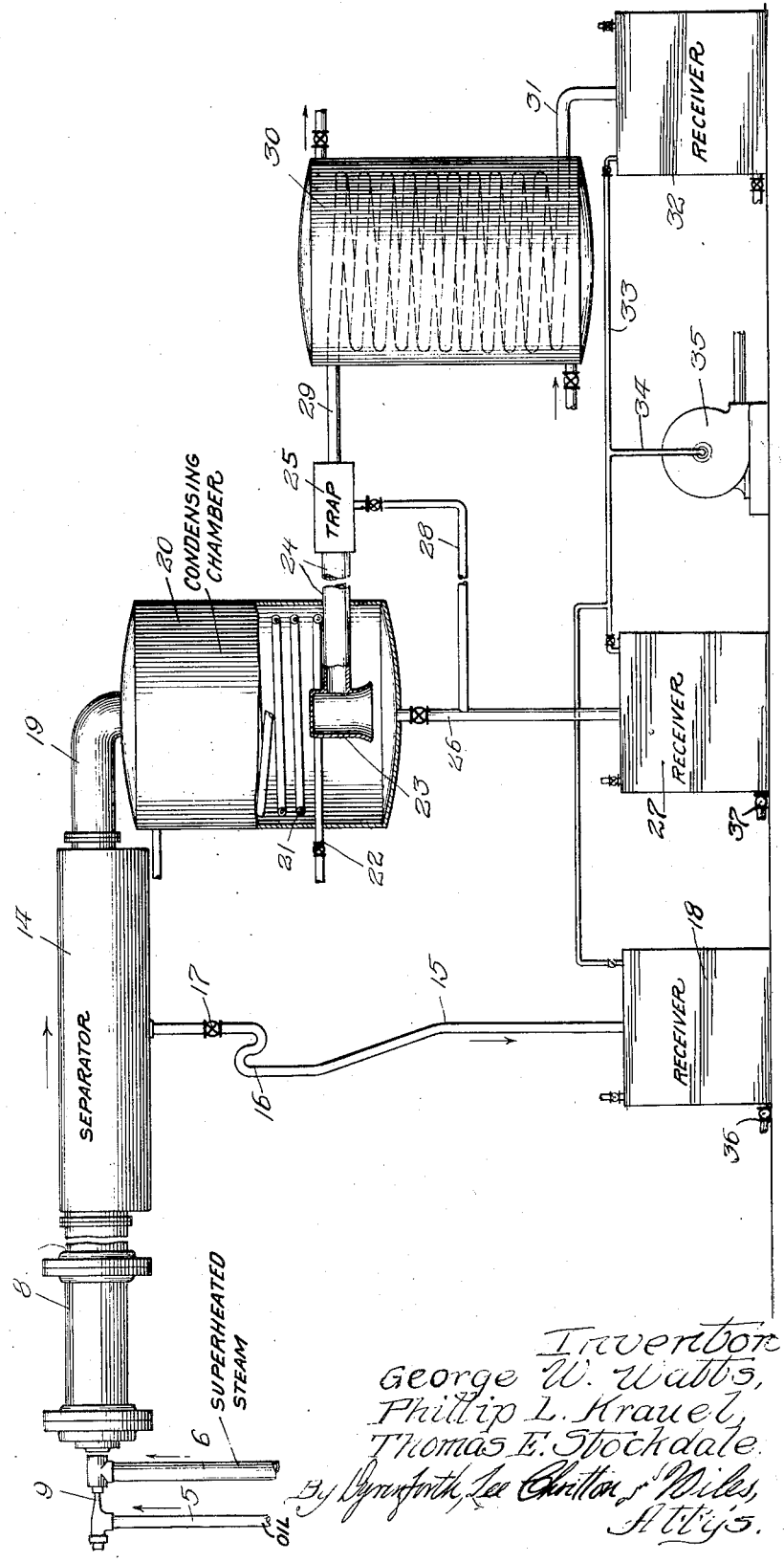

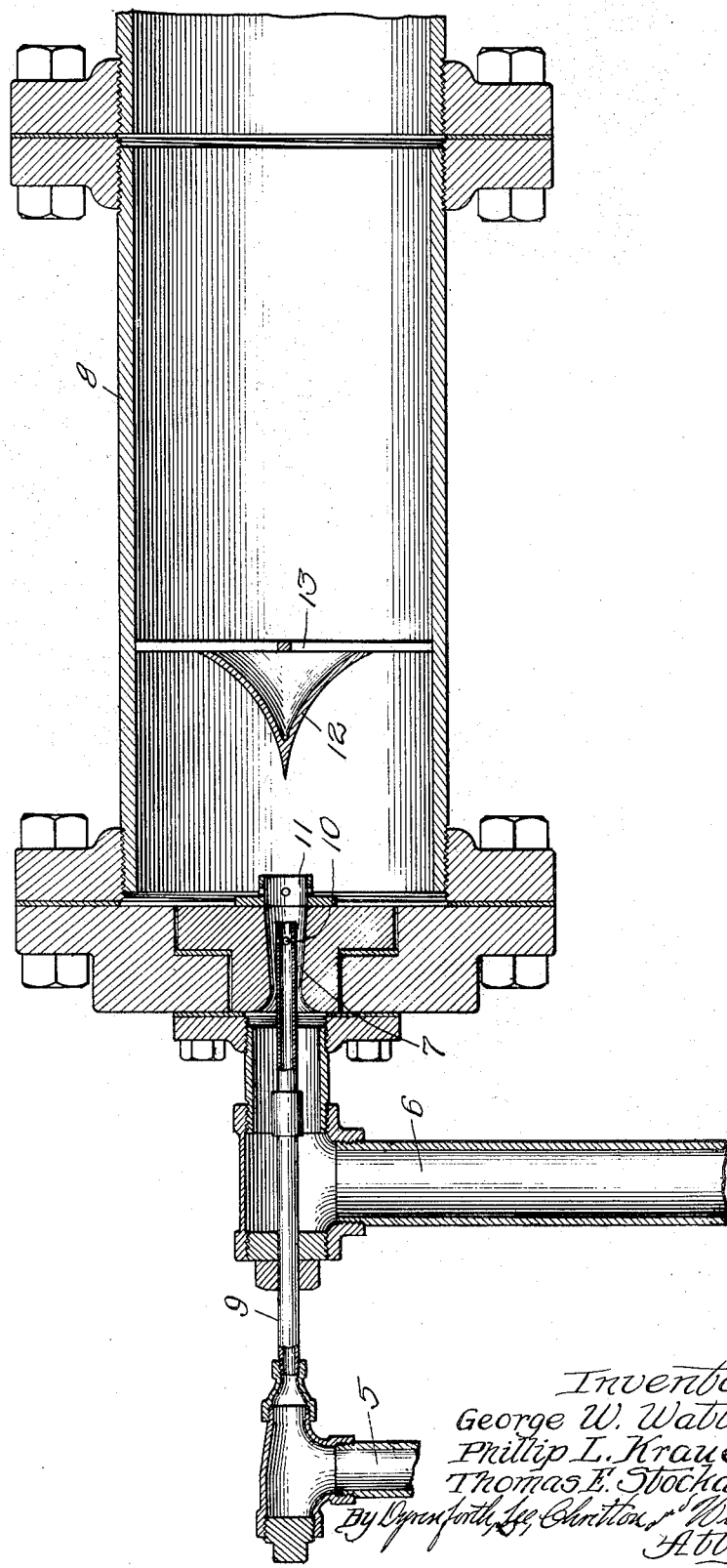

Patented Dec. 9, 1930

1,784,561

UNITED STATES PATENT OFFICE

GEORGE W. WATTS, PHILIP L. KRAUEL, AND THOMAS E. STOCKDALE, OF WHITING, INDIANA, ASSIGNORS TO STANDARD OIL COMPANY, OF WHITING, INDIANA, A CORPORATION OF INDIANA

DISTILLATION OF HYDROCARBON OILS

Application filed April 3, 1925. Serial No. 20,414.

The present invention relates to improvements in the distillation of hydrocarbon oils, and is more particularly intended for use in connection with the distillation under vacuum of heavy oils, such as the residues derived from the continuous distillation of crude oil with fire and steam. It will be fully understood from the following description, illustrated by the accompanying drawings, in which:

Figure 1 is a diagrammatic view, partly in section, of apparatus suitable for carrying the invention into effect; and Figure 2 is a sectional view through the heating or interchange device used in carrying out the present invention.

In carrying out the invention, the oil to be distilled is supplied to the system through a pipe 5, the oil suitably coming directly from the last still of continuous battery of fire and steam stills, for example, as described in the U. S. patent to one of us, No. 1,689,606. Superheated steam, suitably at atmospheric pressure, is supplied through the pipe 6, and enters the expanding nozzle 7, through which it passes into the conduit 8, which is maintained under sub-atmospheric pressure. In the nozzle 7 the steam is expanded to about the reduced pressure prevailing in the conduit 8. The oil, supplied through the pipe 5, flows through a small feed pipe or conduit 9 (see Fig. 2), which enters the steam expanding nozzle 7, being preferably placed centrally therewithin and spaced from the walls of the nozzle. The feed conduit 9 terminates beyond the throat of nozzle 7, being provided therein with distributing openings 10, suitably located at such a point in the nozzle that the temperature of the steam is already appreciably reduced, as more fully pointed out hereinafter. The oil is atomized and carried forward in a spray by the expanding steam, entering the conduit 8. In front of the opening 11 of the nozzle 7 there may be suitably placed within the conduit 8, a deflector 12, mounted upon a spider 13. The deflector 12 directs the projected spray toward the walls of the conduit 8, thereby preventing its passage through any substantial portion of the conduit in the form of a solid stream or spray. Within the conduit 8 the oil, steam and vapor quickly assume a steady flow at a rate predetermined by the dimensions of the conduit. The length of the conduit 8 is sufficient to permit the mixture of oil, steam and vapor to attain thermal equilibrium, the desired proportion of the oil being vaporized. From the conduit 8, the vapors and oil enter the separator 14, in which the unvaporized oil is separated from the vapors present, preferably substantially without change in velocity of the latter. As more fully described in the U. S. Patent No. 1,751,182 to Robert E. Wilson, the conduit contains a plurality of helical vanes or an Archimedean screw, which is substantially fixed in position and extends wholly or partly through the conduit 14. Thus, the mixture of the vapors and unvaporized liquid is given a rapid rotating or whirling movement, thereby throwing out upon the walls of the conduit 14 the unvaporized liquid, which drains off through the pipe 15. The unvaporized oil collected in the separator 14 is discharged through the conduit 15 provided with a trap 16 and a control valve 17, into a receiver 18. From the separator the vapors, consisting of the vaporized portions of the oil and steam, pass through conduit 19 into the condensing chamber 20, in which the vapors are cooled, for example, by the cooling coils 21, to which a suitable cooling medium, such as water or oil, is supplied through the valved pipe 22.

The condenser 20 is preferably so controlled as to condense the oil vapors without condensing the steam accompanying them. Uncondensed vapors are collected by any suitable means, for example, the inverted hood 23 and pass out through conduit 24 and separator or trap 25, in which entrained condensate is separated. Condensate formed in the condenser 20 is drawn off through the valved pipe 26 and passes into the receiver 27. Condensate trapped out in the separator 25 passes through valved pipe 28 into the pipe 26 leading to the condensate receiver 27. The steam continues from the separator 25 through pipe 29 to the condenser 30, in which it is condensed, and the resulting condensate passes out through pipe 31 into a suitable receiver 32. The receivers 18, 27 and 32 are connected by lines 33 to the intake pipe 34 of the vacuum pump 35, by which the desired vacuum is maintained upon the system.

In carrying out the invention the oil to be distilled, suitably a residue from the continuous fire and steam distillation of a crude oil, is fed to the system through the pipe 5, preferably directly from the continuous battery in which the distillation of the crude is effected. For example, the stock employed may be such a residue representing the final 20% of a mid-continent crude and having a temperature of 650 to 750° F., (substantially the temperature prevailing in the last still of the battery from which it is derived). Superheated steam, for example, at 900° to 1200° F. and at atmospheric pressure is supplied to the system through the pipe 6. The amount of steam supplied is proportioned to the extent to which it is desired to conduct the distillation of the oil undergoing treatment, and may suitably be from 2 to 10 pounds per gallon of oil distillate. For example, in order to effect the distillation of an oil such as that hereinbefore described to a 20% residue (amounting to 4 to 5% on the original crude), from 4 to 5 pounds of steam per gallon of oil distillate may be employed under the conditions more specifically hereinafter set forth.

Within the conduit and in the remainder of the distillation process a substantially reduced pressure is maintained, preferably from 25 to 75 millimeters absolute. In its passage through the nozzle 7, the pressure upon the steam is reduced and it is propelled forward at a high velocity. The reduction in pressure is accompanied by a drop in temperature, the oil inlet openings 10 being so located that the temperature of the steam at that point is not in excess of 900° F., and preferably between 325° and 650° F. The oil is finely subdivided by the rapidly traveling stream of expanding steam, this stream being forced outward and prevented from traveling as a solid stream of spray by the deflector 12. The spray or mixture of oil and steam resumes steady flow through the conduit 8, which is so proportioned that the velocity of the steam therethrough, in steady flow, is from 200 to 600 feet per second, preferably about 400 feet per second. In resuming steady flow at this rate, sufficient heat reverts to the body of steam and oil to bring the mixture to a temperature of 650 to 750° F. and to supply the latent heat necessary for the vaporization of the desired portions of the oil. The conduit 8, which may be designated as an equilibrium conduit, is of sufficient length to permit the mixture of steam, oil and vapor to come to substantial equilibrium, this being accomplished in a travel of from one-fifteenth to one second. The mixture of vapors and unvaporized oil then passes through the separator 14, in which it is given a rapid whirling movement without substantial reduction in velocity, as pointed out in the prior patent to Robert E. Wilson, hereinbefore referred to, with the result that the unvaporized oil is thrown out, collected and discharged through the conduit 15. This oil is collected in the vented container 18, from which it may be withdrawn through the discharged line 36.

The vapors, consisting of steam and vaporized oil, pass into the condenser 20, which is maintained at a suitable temperature to effect condensation of the oil. The condensed oil discharges through the line 26 into the vented container 27. Uncondensed steam, together with any entrained oil carried thereby, passes out through the collector 23 and line 24 into and through the trap or separator 25, in which the entrained oil is separated out and returned to the line 26 through the line 28. Distillate is collected in the receptacle 27, from which it may be discharged at will through the line 37. The steam passes out through the condenser 30 and the condensed water is collected in the receiver 32.

The distillate produced is characterized in that it contains petrolatum wax, substantially unchanged, and a typical 80% distillate on a residuum on such as that previously described (amounting to 16% on the original crude) has the following characteristics:

22.6° A. P. I. gravity; flash 390° F.; 72 sec. Saybolt viscosity at 210° F.; solid at 90° F. The residuum formed in the same process, amounting to 4% on the original crude, is found to have a melting point of about 196° F., a gravity of 1.07 at 77° F., a viscosity of 90 Engler at about 350° F., and to contain 96 to 98% of carbon tetrachloride and carbon di-sulfide soluble constituents.

We claim:

1. The method of distillation of hydrocarbon oils comprising supplying superheated steam to a gradually expanding passage, the temperature of the steam being reduced as it travels therethrough, supplying oil to the at least partially expanded steam where the temperature of the steam is less than 900° F., discharging the steam and oil carried thereby into a conduit at reduced pressure, said conduit being of substantially larger cross section than the passage, and causing the mass of vapors and oil to pass in steady flow through said conduit without substantial separation of oil and vapor therein.

2. The method of distillation of hydrocarbon oils comprising supplying superheated steam to a gradually expanding passage, the temperature of the steam being reduced as it travels therethrough, supplying oil to the at least partially expanded steam where the temperature of the steam is less than 900° F., discharging the steam and oil carried thereby directly into a conduit at reduced pressure, said conduit being of substantially larger cross-section than said passage, and causing the mass of vapors and oil to pass in steady flow through said conduit without substantial separation of oil and vapor therein.

3. The method of distillation of hydrocarbon oils comprising supplying superheated steam to a gradually expanding passage, the temperature of the steam being reduced as it travels therethrough, supplying oil to the expanding steam before complete expansion and where the temperature of the steam is less than 900° F., and discharging the steam and oil carried thereby into an enlarged chamber at reduced pressure.

4. The method of distillation of hydrocarbon oils wherein superheated steam is expanded in a gradually expanding passage, its temperature being reduced as it travels therethrough, oil is supplied to said passage at a point therein where the temperature of the steam is less than 900° F., the mixture of steam and oil carried thereby is caused to flow without separation through a conduit under said reduced pressure at a rate substantially less than the velocity of issuance of the steam and oil from said expanding conduit, heat being thereby applied to the mixture of steam and oil, and unvaporized oil is subsequently separated from the steam and vaporized oil.

5. The method of distillation of hydrocarbon oils wherein superheated steam at a temperature of 900° to 1200° F. is expanded in a gradually expanding passage, its temperature being reduced as it travels therethrough, oil is supplied to said conduit at a point therein where the temperature of the steam is less than 900° F., the mixture of steam and oil carried thereby is caused to flow without separation through a conduit under reduced pressure at a velocity of 200 to 600 feet per second, heat thereby reverting to the mixture of steam and oil, and unvaporized oil is subsequently separated from the steam and vaporized oil.

6. The method of distillation of hydrocarbon oils, which comprises expanding superheated steam through an expanding passage into a conduit of substantially greater cross-sectional area, the temperature of the steam being reduced in traveling through the expanding passage, feeding oil into the stream of steam in the expanding passage at a point where the temperature of the steam is from 325 to 900° F., causing the steam and oil mixture to flow steadily without substantial separation through the conduit into which said expanding passage opens at a rate substantially less than the velocity of issuance of the steam and oil from said expanding conduit, heat being thereby supplied to the mixture of steam and vapor, and separating unvaporized oil from said mixture without substantial decrease in its velocity of flow.

7. In apparatus for the distillation of hydrocarbon oils, an expanding nozzle provided with a constricted throat, means for passing superheated steam through the throat of said nozzle, and means for supplying oil within the nozzle to the steam after the steam passes the throat of said expanding nozzle.

8. In apparatus for the distillation of hydrocarbon oils, an expanding nozzle having a constricted throat, a conduit of larger cross-sectional area than said expanding nozzle into which the nozzle opens, means for supplying superheated steam to said expanding nozzle, means for supplying oil within the nozzle to the expanding steam after the steam passes the throat of said expanding nozzle, and means for maintaining a reduced pressure within the enlarged conduit.

9. In apparatus for the distillation of hydrocarbon oils, an expanding nozzle, means for supplying superheated steam to said nozzle, a conduit of larger cross-sectional area into which said nozzle opens, said conduit being maintained at reduced pressure, an oil feed pipe extending longitudinally through said nozzle and provided with exit openings at an intermediate point therein, and means for supplying oil to said feed pipe.

10. In apparatus for the distillation of hydrocarbon oils, an expanding nozzle, means for supplying superheated steam to said nozzle, a conduit of larger cross-sectional area into which said nozzle opens, said conduit being maintained at reduced pressure, means for supplying oil within said nozzle where the steam is at least partially expanded, and means within the conduit for diverting transversely the projected stream of vapor and oil issuing from the nozzle, the stream of vapor and oil continuing to travel through said conduit beyond said diverting means, whereby intimate intermixture thereof is effected.

11. In the vacuum distillation of hydrocarbon oils, expanding superheated steam through an expanding passage into an enlarged conduit at reduced pressure, supplying oil to the at least partially expanded steam before entering said conduit, impinging the mass of vapor and oil particles against a surface within said conduit and subsequently causing the mass of vapor and oil particles to move forwardly through the conduit in steady flow at a rate of at least 200 feet per second.

GEORGE W. WATTS.
PHILIP L. KRAUEL.
THOMAS E. STOCKDALE.